July 6, 1965 T. W. GAVIN 3,192,856
REPETITIVE CYCLE ROTARY IMPRESSION MACHINE
Filed Sept. 1, 1964 4 Sheets-Sheet 1

INVENTOR.
THOMAS W. GAVIN
BY
ATTORNEYS

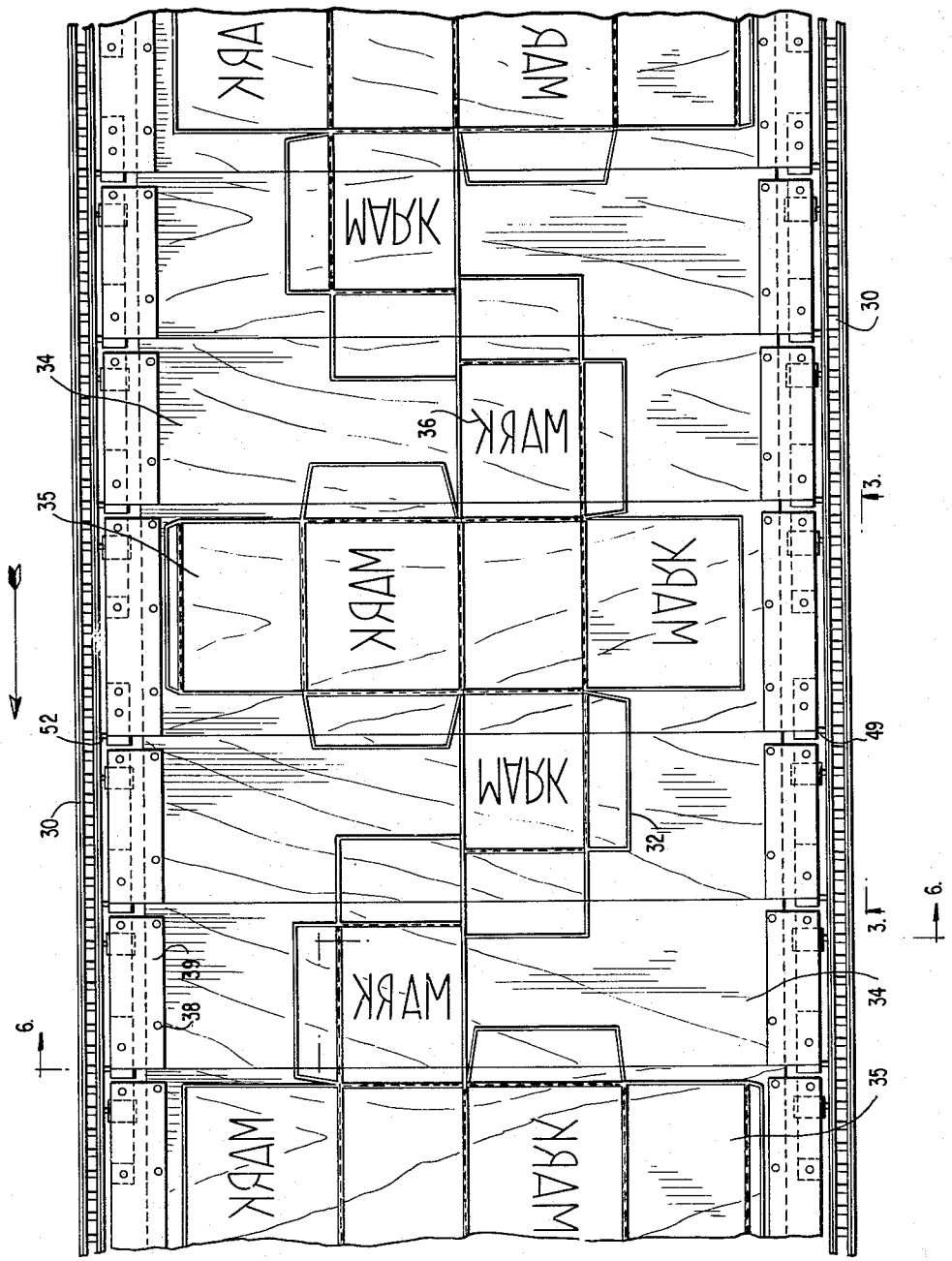

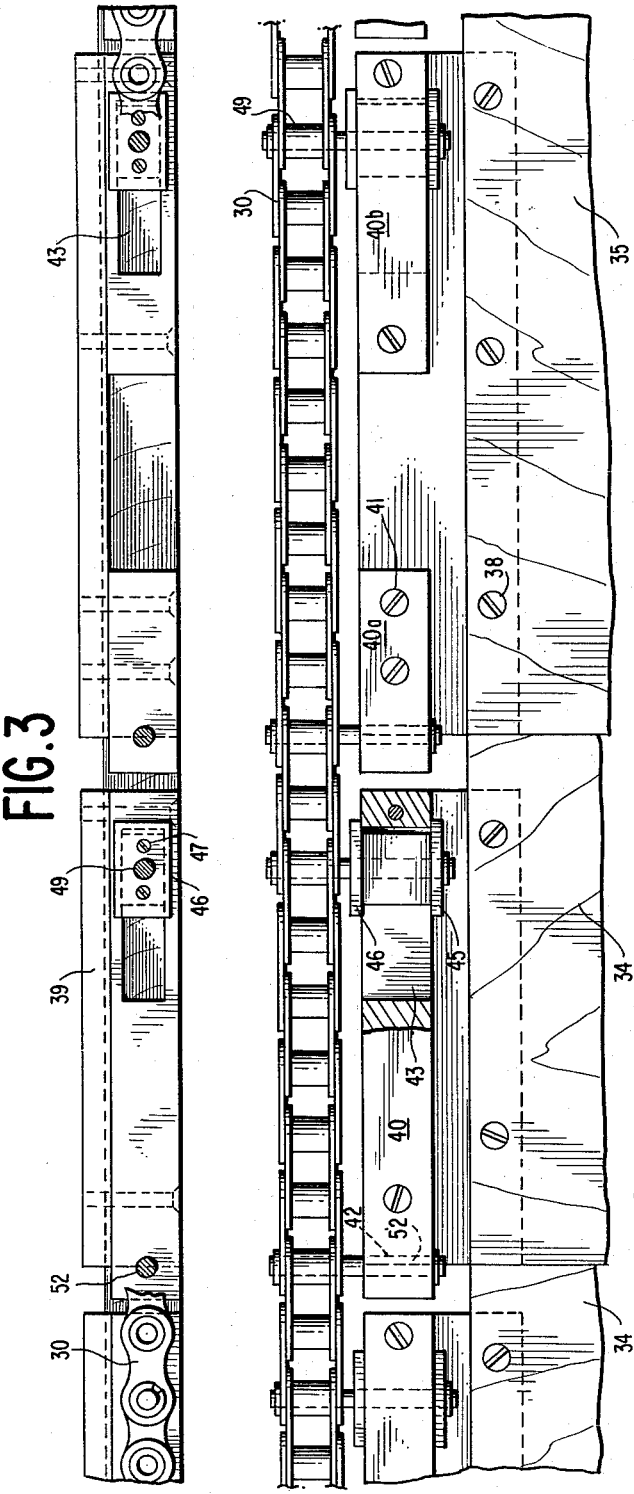

July 6, 1965  T. W. GAVIN  3,192,856
REPETITIVE CYCLE ROTARY IMPRESSION MACHINE
Filed Sept. 1, 1964  4 Sheets-Sheet 4
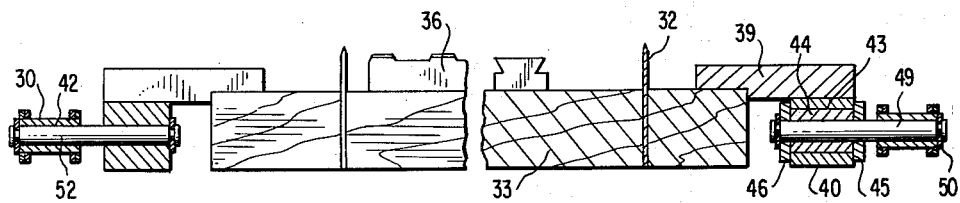
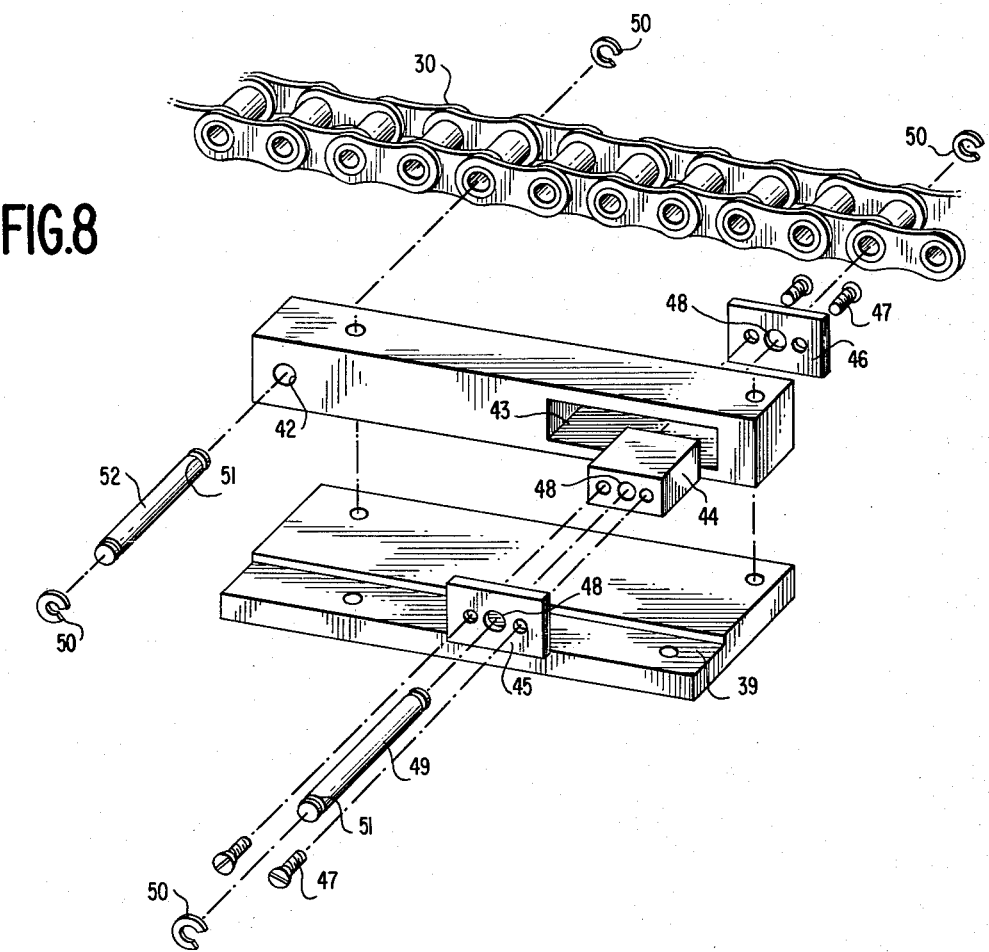
INVENTOR.
THOMAS W. GAVIN
BY Dennison and Dennison
ATTORNEYS United States Patent Office 3,192,856
Patented July 6, 1965

3,192,856
REPETITIVE CYCLE ROTARY IMPRESSION
MACHINE
Thomas W. Gavin, 3695 Orchard Road, Wantagh, N.Y.
Filed Sept. 1, 1964, Ser. No. 393,680
13 Claims. (Cl. 101—259)

The present invention relates to new and useful improvements in repetitive cycle rotary impression machines and more particularly to a die cutting or printing machine utilizing a plurality of elongated slats having impression members carried thereon, said slats being associated in an endless belt.

In the related arts of printing and die cutting great strides have been taken to provide high speed machines to imprint and/or die cut material fed into the machine either in continuous strip form or in individual blanks. The advantages of printing or die cutting upon an indefinite length of web material moving from a supply roll are numerous and such operation has been found to be faster and more economical than printing or die cutting individual sheets or blanks. Previous machines for making an impression upon a stock web moving from a supply reel have had certain inherent limitations. The impression members, whether steel rules for die cutting, or type and cuts for printing have of necessity been mounted either upon a rotary cylinder or upon a flat bed adapted to be reciprocated into contact with the stock material. With the rotary cylinder machine dimensional limitations are readily apparent. The impression members must be located about the periphery of a rotary drum and hence the running length of the design to be printed or cut is limited and is dependent upon the circumference of the drum. Limitations on floor space and ceiling height in conventional plants severely limit the diameter of drums that can be used in such a machine, hence such rotary drum impression machines can only be used where the design to be imprinted or die cut into the stock is of relatively short running length.

Other types of conventional impression machines have been utilized to work upon endless stock material including toggle-activated vertical stroke platen presses, clam shell platen presses, and reciprocating bed machines. In each of the above devices, it is necessary to stop the material in its movement across the press face for a short interval while impression of the die or type face is made against the stock material. This series of interruptions results in wasted time as well as complex mechanisms to insure proper timing of material feed and impression actuation.

The machine of the instant invention permits printing, cutting, slitting, scoring, and the like upon continuous webs of material as well as upon sheets or blanks. Throughout the annexed specification, the word "impression" is used generally to indicate either printing, die cutting, scoring or slitting.

Previous attempts have been made to employ an endless belt circulating about a plurality of pulleys or sprockets with a series of impression members placed upon the outer belt surface. The impression has generally been made to take place on one of the horizontal runs of the belt, usually the upper run. Difficulty has been found in each of these machines and the same have never been commercially successful because it is essential, especially in die cutting and precision printing, that the impression member be under close control and hence be relatively rigid and planar. Of course with an endless belt it is necessary for the impression material to pass about the pulleys or sprocket wheels in a circular fashion and hence, it has been proposed to divide the impression member into a series of interconnected slats. Such slats can when properly spaced and supported, traverse the circular portion of endless belt runs; however, when the same are in their horizontal position they will be spaced apart and will not abut. Such spaces are a deterrent to die cutting and in particular to manufacturing of boxes and the like. The present invention overcomes these problems and sets forth a machine wherein the overall layout of the design to be impressed is divided into a plurality of slats interconnected in such a manner as to remain in abutting controlled relationship during their planar travel, yet to separate without binding and to pass in a flexible manner about a sprocket wheel or drive pulley. The abutment of adjacent slats during planar travel is necessary to enable utilization of a continuous pattern for impression.

The rotary impression machine of this invention obviates all of the known defects previously associated with such devices and further results in considerable savings of time and expense to the operator. It has been found that the apparatus described has been especially useful in the field of box cutting and printing.

It is an object of the present invention to provide a rotary impression machine of the repetitive cycle type that has a plurality of impression members interconnected in an endless belt.

It is a further object of this invention to provide a repetitive cycle rotary impression machine utilizing a plurality of slats interconnected in an endless belt wherein means are provided for maintaining adjacent slats in abutting relationship during planar travel of the belt, yet permitting movement of the slats about a circular sprocket wheel or drive drum.

Another object of this invention is to provide a moveable loop carrying a series of impression members thereon, a portion of the loop defining the impression area of the machine.

A still further obejct of this invention is to provide an endless loop repetitive cycle impression machine which may be quickly adjusted to accommodate varied widths of the impression carrying means.

Another object of this invention is to provide a linkage construction for a conveyor slat that will permit one end of the slat to be fixed with regard to a roller link chain and yet will permit the other end of the slat to move longitudinally in relation to the link chain.

Other objects of the invention are to provide a repetitive cycle rotary impression machine, bearing the above objects in mind, which is of durable construction, is at all times efficient, safe and accurate in use, and which will reduce time and hence costs of the impression process.

For other objects and for a better understanding of the invention, reference may be had to the following detailed description taken in conjunction with the accompanying drawings in which:

FIG. 2 is an enlarged plan view of a portion of the upper horizontal run of the loop taken on the lines 2—2 of FIG. 1;

FIG. 3 is a side elevation of the conveyor chain and slat arrangement taken along lines 3—3 of FIG. 2 with a portion of the roller chain being broken away to show the details of the slat linkage;

FIG. 4 is a fragmentary plan view taken from below of the slats and roller chain linkage shown in FIG. 3;

FIG. 5 is a diagrammatic side elevation of one of the slats passing over the left hand sprocket wheel of the machine shown in FIG. 1;

FIG. 6 is an enlarged sectional view taken along lines 6—6 of FIG. 2;

FIG. 8 is an exploded perspective of the slat attachment device shown in FIG. 7.

Reference is now made more specifically to the drawings wherein like numerals designate similar parts throughout the several views and wherein the repetitive cycle rotary impression machine of the present invention is designated generally at 10.

Figure 1:
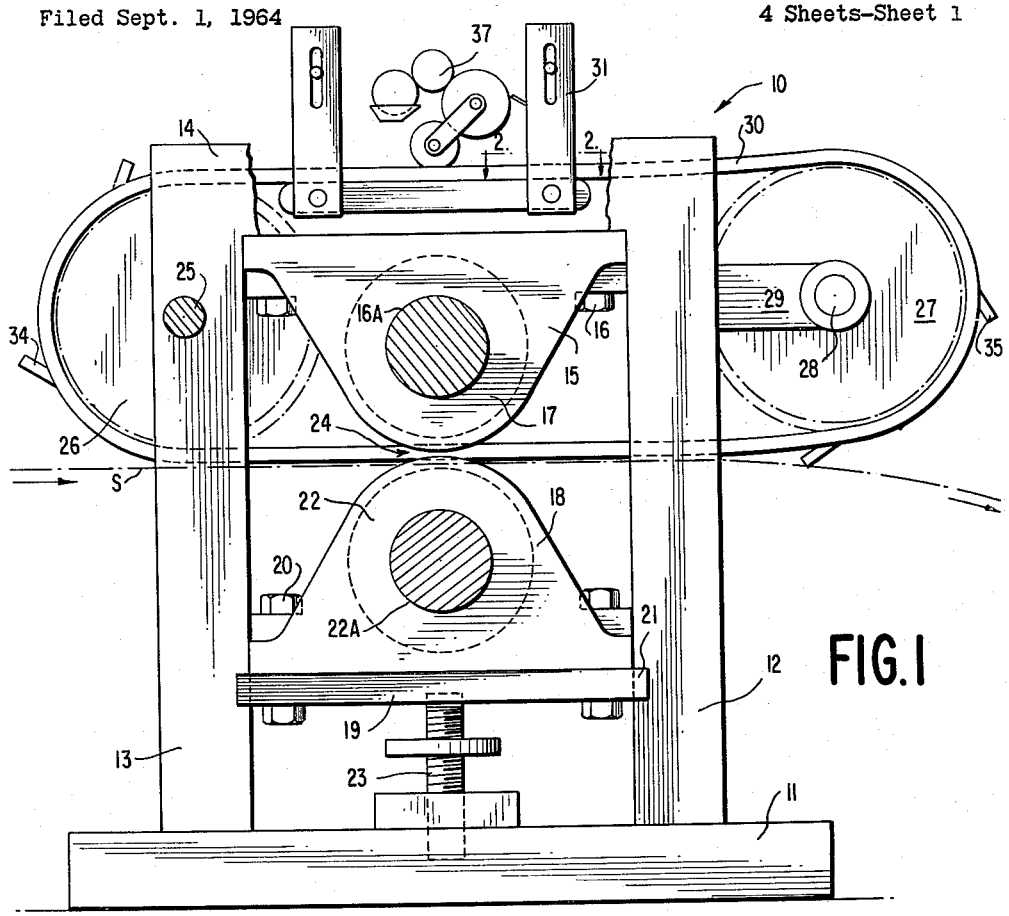
FIG. 1 is a diagrammatical illustration of a side elevation of a rotary impression machine utilizing the teachings of the instant invention.

Although the preferred embodiment of the machine as set forth in FIG. 1 employs an impression area located between two rotary presser rolls, it should be understood that the endless belt impression device could well be utilized in other types of impression mechanisms including, but not limited to, toggle-activated vertical stroke platen presses, claim shell platen presses, and reciprocating bed machines.

The substructure or bed of the machine 10 includes a base plate 11 firmly anchored to the floor of the shop or plant. Opposed pairs of vertical standards 12 and 13 extend upwardly from base plate 11 and serve to support the mechanical components of the machine. A horizontal cross support member 14 is secured or formed integral with opposed standards. The general substructure layout is a four-poster with conventional frame bracing where needed.

A pair of upper pillow blocks 15 are supported on the standards 12 and 13 as by bolts 16. It is understood, of course, that pillow blocks 15 are placed on either side of the machine. Journaled between the upper pillow blocks 15 in bearing means 16A is an upper presser roll 17. A pair of lower pillow blocks 18 are supported on a vertically moveable plate 19 and are secured thereto as by bolts 20. The moveable plate or framework 19 may be provided with guide portions or flanges 21 adapted to slideably engage the vertical standards 12 and 13. A lower presser roll 22 is journaled in bearings 22A between the lower pillow blocks 18. A jack screw 23 is provided between the base plate 11 and the moveable frame 19 in order to provide a vertical adjustment of the lower presser roll with respect to the upper presser roll. If desired, hydraulic jack means or any other comparable adjusting device may be used. It is the adjustable gap as shown generally at 24 which defines the impression area of the machine wherein the dies or printing members come into contact with the stock materials to be impressed. Since great pressure is developed in this area, it is essential that adjustment be provided and also it is desirable that the presser rolls be coated in some manner as with rubber, polyurethane, or some other suitable material that will withstand the harsh cutting action of sharp dies and the like over a long period of time.

Rotatably journaled between the vertical standards 13 is the sprocket shaft 25. A pair of drive sprockets 26 are carried by the shaft and are adapted to be rotated by any conventional power source attached thereto or to one end of shaft 25. A similar pair of sprocket wheels 27, which may be either idlers or driving wheels, are secured rotatably upon shaft 28 which in turn is mounted on a bracket 29 mounted or secured for lateral adjustment upon the standards 12. Bracket 29 may be moved laterally of the axis of shaft 28 in order to accommodate endless belts of different lengths. If it is desired that both pairs of sprocket wheels be driven, interconnected gearing or other conventional timing means may be employed to insure synchronization of both pairs of sprockets.

An endless roller link chain 30 is engaged about each of the sprocket pairs 26 and 27. The chains 30 are of conventional construction and are preferably provided with hollow center connecting link pins for a purpose later to be described. One link in each chain is of the easily openable type in order to permit chain separation and replacement.

A slack tightener arrangement 31 is provided for the upper horizontal run of the conveyor belt as shown in FIG. 1. This arrangement permits the upper run of the belt to remain substantially horizontal and compensates for the natural sag in the long run of the belt.

The impression members of the instant apparatus are embedded or otherwise secured upon a wooden backing board or the like. The article to be impressed is shown by way of example in the drawings to be a cardboard box blank. Every box blank arrangement has its own layout, and knowing the overall single pattern to be worked, the machine operator can design a practical multiple layout as shown for example in FIG. 2. From this multiple layout a die is made by inserting steel rule dies 32 into the wooden backing member 33. Dimensional limitations are not important and the overall die construction may be made as long or as wide as necessary. Once the final die design is achieved and the layout made, the wooden backing member can be cut up into desired lengths to form a plurality of slats 34 and 35. The line on the wooden backing upon which the cut is made to provide the slats is chosen so as to be spaced somewhat from any of the die rules which will be parallel to the cuts. This is necessary in order to insure strength of the rule, the same being supported by sufficient thickness of material to perform its desired function. It will be noted that the slats may be made of any desired length as long as the length is related to the pin-to-pin length of the chain. For example, if the center pin spacing of the roller link chain 30 is fixed at one-half of an inch, the slats must be cut to width increments of one-half of an inch.

It will be noted in the example shown in FIG. 2 that slats 34 and 35 are of different dimension. This is permissible and even necessary in most instances in order to cut the slat properly to maintain proper die rule support.

Rubber or steel printing type 36 may also be placed upon the top face of the backing member 33 and may be used as the impression means in combination with or separate from the steel ruling dies 32. When a printing member is utilized it is necessary of course to provide some form of inking means operable once each cycle to apply an ink coating to the type face. Such means is shown schematically at 37 in FIG. 1.

In order to provide for the use of a wider or narrower backing member 33 at least one set of sprocket members 26 and 27 may be adjustably secured upon their shafts 25 and 28 so that they may be moved axially with regard thereto. This provides an easy adjustment for accepting longer slat members. It would of course, be necessary to so space the companion standards 12 and 13 that they may readily accept such adjustment up to the maximum desired size.

Figure 7:
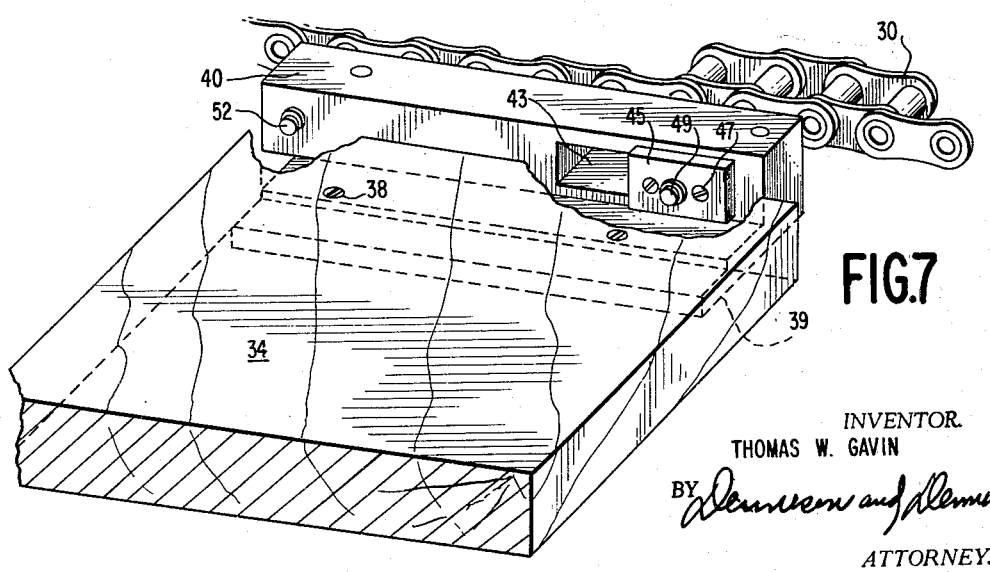
FIG. 7 is a perspective view of a portion of one of the slats of the instant invention and the means interconnecting the same to one of the roller chain runs.

In order to insure close abutment of adjacent slats during planar portions of their travel and yet to allow the slats to pass about the circle at the end of the run during passage of roller link chains 30 about the sprocket wheels 26 and 27, it is necessary to provide a compensating device for securing the slats to the chains. Such a compensating means is shown in FIGS. 6, 7, and 8. Each of the slats 34 and 35 are secured at each of their sides, as by screws 38, to a slat attachment plate 39. A compensating bar 40 is secured along one edge of and on the bottom face of the slat attachment plates. Fasteners 41 or the like may be used for this purpose. If desired the compensating bar may be made into two sections as shown at 40a and 40b in FIG. 4. This two-piece construction is desirable for the compensating means attached to the longer slats 35 for example. It should be noted that the leading end of the compensating bar 40 extends forwardly of the slat attachment plate 39 and the slats 34 and 35. A pin receiving hole 42 is provided in this forwardly extending portion and is located such that its axis lies directly over the leading edge of the slat 34 or 35. A slot 43 is formed completely through the compensating bar 40 adjacent the opposite end thereof and slidably receives a slider block 44 which is adapted to move laterally therein. Slider block end plates 45 and 46 are attached to the end faces of slider block 44 by screws 47. The end plates are of a larger dimension than the slot 43 and serve to retain the slider block from movement out of the slot. Both the slider block and the slider block end plates have an aperture 48 centrally located therein for reception of a roller link chain extension pin 49. Extension pin 49 is of such a length as to pass from one end of plate 45 through the far end of the adjacent roller link chain 30. The extension pin is secured from axial movement within these parts by means of conventional spring retaining clips or the like 50 which are adapted to fit within grooves 51 machined in the extension pin 49 adjacent each end thereof.

It will be noted by examination of FIG. 7 that the trailing end of slat 34 projects rearwardly of the trailing end face of the compensating bar 40 and the slot attachment plate 39.

A similar roller link chain extension pin 52 is fitted through the hole 42, previously described, and extends completely through the hole 42, previously described, and extends completely through the leading end of compensating bar 40 and the roller link chain 30. This extension pin serves as the fixed pivot point for the compensating bar and its associated slat 34 or 35. Pin 52 is retained from axial movement within hole 42 and the hollow center of the link pin by means of the retaining clips 50 fitted in grooves 51 machined in the ends of pin 52. It should be noted that pins 49 and 52 are the same height above slat attachment plate 39.

The particular action of the compensating mechanism is clearly demonstrated in FIG. 5. In this position of the endless belt the leading slat has reached the sprocket wheel 26 and is in the process of changing from horizontal planar movement to circular movement about the periphery of the sprocket 26. Of course, pivot pins 49 and 52 are fixed with respect to the chain; pin 52 also being fixed with regard to the compensating bar 40 and hence the associated slat 34. Pin 49 and its associated slide block 44 are however moveable with respect to the slat 34. As the fixed pivot point 52 starts around the periphery of the sprocket 26, its horizontal velocity component becomes less than the horizontal velocity of the moveable point 49. This velocity differential results in the slide block 44 moving from right to left in FIG. 5 within the slot 43 of the compensating bar 40. The trailing end of slat 34 will therefore rise up about fixed pivot point 52 and will disengage from abutting relation with the leading edge of the adjacent slat. As the slat continues about the sprocket periphery the slide block 44 will continue to move from right to left until a point is reached, wherein the slat is progressing about the lower half of the sprocket, at this point the slide bar will begin to move back toward the trailing edge and will continue to still move until the slats are again in abutting relationship at the bottom horizontal run as shown in FIG. 1.

Without the compensation device set forth above, only one point of each slat could be fixed and properly timed to the chain revolution, thus firm control of the slats throughout a complete revolution would not be possible. Precise control is needed in order to secure the slats so that they cannot flop loose at any stage of their travel and also to predetermine the orientation of each slat in all positions at all times throughout the course of the loop. The lead and trailing edges of each of the slats being controlled, the slats can be made to travel a precise repetitive path, according to the length and course of the systems layout.

It is contemplated that the same loop system could be used carrying the long runs of the loop in a vertical direction. This would permit the vertical loop to be employed between a cylinder and a reciprocable press bed if desired, or between two cylinders or any other impression area.

FIG. 1 shows stock materials being fed from a supply roll, not shown, through the impression area at 24 and then out to a take up means, not shown. It can be seen from this figure that the type or die members are carried by the slats in such a manner that they will be above the stock material being worked upon and problems of the stock material adhering to the die are obviated. The stock material is in effect self stripping and takes advantage of the force of gravity to aid in the removal from the impression member. This is especially important when die cutting stiff material such as board or corrugated stock which will not curl around a die cutting cylinder. Retaining the printed side of the stock material uppermost also eliminates smearing and offsetting which is prevalent in prior art devices.

In order to change the length of any pattern to be worked, one or a combination of methods may be used; more or fewer slats of a uniform length may be utilized with the unused portion of the loop remaining void of an impression medium; more than one length of slat may be used to achieve a desired length, or the length of the vertical loop may be changed by means of adjustment of the moveable bracket 29. The loop length must of course be long enough to encircle the sprocket pairs and the platen or cylinder making up the upper half of the impression device. Since the two loops of the roller chain are moveable from side to side on their shafts as previously described, enabling a wide or narrow die set or printing type to be mounted in the system. The amount of adjustment for width is infinitesimal, limited only by the physical size of the steel rule or type, such as a comma or period of the smallest point of the smallest font face, on the minimum side. The maximum working area would be determined of course by the distance between the side frame pairs 12 and 13 of the machine. Thus when a narrow sheet is being worked, the sprocket wheels and their associated roller chains are moved closer together on the shafts 25 and 28.

It will be understood that when running a continuous pattern on a roll or web of stock material, a self-feeding action is achieved by the pulling squeeze of the slat on the stock going through the impression area 24. However, when feeding a series of sheets or blanks, a feeding mechanism of conventional construction may be utilized.

While I have shown and described a preferred embodiment of the invention, it is to be understood that the drawings and detailed disclosure are to be construed in an illustrative rather than a limiting sense, since various modifications and substitutions of equivalent may be made by those skilled in the art within the spirit and scope of the invention as defined in the appended claims.

What I claim as my invention and desire to secure by Letters Patent of the United States is:

1. A rotary impression machine comprising a framework, a pair of endless flexible carrier means mounted on said framework, said carrier means being in spaced apart parallel relation, means to drive at least one of said carrier means, the path of movement of said carrier means having a planar portion, a plurality of slats attached to and extending between each of said carrier means and being separate from and independent of each other, impression members carried by at least some of said slats, said slats being in abutting relation to each other during said planar movement of said carrier means, the leading end of each slat being pivotally connected to and fixed to travel with said carrier means, and compensating means connecting the trailing end of each slat to said carrier means and permitting limited movement of the trailing end of said slat with respect to said carrier means, whereby said slats will move apart from said abutting relation during non-planar movement of said carrier means.

2. A rotary impression machine comprising a framework, a pair of parallel shafts within said framework, a pair of spaced apart sprocket wheels on each of said shafts, a pair of endless link chain means, one chain means extending about one sprocket wheel in each pair, means to drive at least one sprocket wheel, the path of movement of said one chain means having a planar portion, a plurality of slats attached to and extending between each of said link chain means and being separate from and independent of each other, impression members carried by at least some of said slats, said slats being in abutting relation to each other during said planar movement of said link chain means, the leading end of each slat being pivotally connected to and fixed to travel with said carrier means, and compensating means connecting the trailing end of each slat to said carrier means and permitting limited movement of the trailing end of said slat with respect to said carrier means, whereby said slats will move apart from said abutting relation during non-planar movement of said one chain means.

3. A rotary impression machine as set forth in claim 2, wherein one sprocket wheel on each shaft is moveable axially of the shaft with respect to said other sprocket wheel to accommodate different width slats.

4. A rotary impression machine as set forth in claim 2, wherein one of said shafts is moveable laterally with respect to the other shaft to provide adjustment to accommodate different length link chains.

5. A repetitive rotary impression machine for making impressions on paper of the like stock material comprising a framework, a pair of endless flexible carrier means, said carrier means being in spaced apart parallel relation, rotary drive means on said framework, said carrier means passing about said rotary drive means, the path of movement of said carrier means having a planar portion, a plurality of slats attached to and extending between each of said carrier means and being separate from and independent of each other, impression members carried by at least some of said slats, said stock material passing into the proximity of said impression members during a portion of the planar travel of said slats, pressure means for bringing said stock material into intimate contact with said impression members during said portion of planar travel of said slats, said slats being secured to said carrier means in abutting relation to each other during planar movement of said carrier means, the leading end of each slat being pivotally connected to and fixed to travel with said carrier means, and compensating means connecting the trailing end of each slat to said carrier means and permitting limited movement of the trailing end of said slat with respect to said carrier means, whereby said slats will move apart from said abutting relation during non-planar movement of said carrier means.

6. A repetitive rotary impression machine as set forth in claim 5, wherein said rotary drive means comprises two pairs of coaxial sprocket wheels, one pair being spaced laterally and in horizontal alignment with the other pair, the planar travel of said carrier means thereby being an upper and a lower horizontal run, said portion of planar travel being on the lower horizontal run.

7. A repetitive rotary impression machine as set forth in claim 5, wherein said impression members comprise printing type and means are further provided for inking said type during each revolution.

8. A repetitive rotary impression machine as set forth in claim 5, wherein said impression members comprise metal die rules for die cutting of said stock material.

9. A rotary impression machine comprising a framework, a pair of endless flexible carrier means mounted on said framework, said carrier means being in spaced apart parallel relation, means to drive at least one of said carrier means, the path of movement of said carrier means having a planar portion, a plurality of slats attached to and extending between each of said carrier means and being separate from said independent of each other, impression members carried by at least some of said slats, said slats being in abutting relation to each other during said planar movement of said carrier means, and compensating means to cause said slats to move apart from said abutting relation during non-planar movement of said carrier means, said last named means comprising a leading pin for each side of the leading end of each slat pivotally secured to each of said carrier means and to the leading side of the slat, whereby said leading pins are fixed to travel with said carrier means, a trailing pin for each side of the trailing end of each slat fixedly secured to each of said carrier means and attachment means mounted on each side of the trailing end of the slat slidably receiving said trailing pin for confined limited movement in relation to its associated slat.

10. A rotary impression machine comprising a framework, a pair of endless roller link chains mounted on said framework, the links of said chains being connected by hollow connecting link pins, said chains being in spaced apart parallel relation, means to drive at least one of said chains, the path of movement of said chains having a planar portion, a plurality of slats attached to and extending between each of said chains, impression members carried by at least some of said slats, said slats being in abutting relation to each other during said planar movement of said chains, and compensating means to cause said slats to move apart from said abutting relation during non-planar movement of said chains, said last named means comprising a compensating bar secured to each side of each slat, a leading pin secured to the side of the leading end of each compensating bar, said pin being pivotally received within one of said hollow connecting link pins, a longitudinal slot adjacent the rear side of each of said compensating bars, a slider block mounted for longitudinal movement in each said slot, a trailing pin secured to each of said slider blocks and extending outwardly thereof, said trailing pins being pivotally received in selected ones of said hollow connecting link pins.

11. A rotary impression machine comprising a framework, a pair of endless flexible carrier means mounted on said framework, said carrier means being in spaced apart parallel relation, means to drive at least one of said carrier means, the path of movement of said carrier means having a planar portion, a plurality of slats attached to and extending between each of said carrier means, impression members carried by at least some of said slats, said slats being in abutting relation to each other during said planar movement of said carrier means, and compensating means to cause said slats to move apart from said abutting relation during non-planar movement of said carrier means, said last named means comprising a compensating bar secured to each side of each slat, a leading pin secured to each side of the leading end of each compensating bar, each pin being pivotally mounted on one of said pair of carrier means, a longitudinal slot adjacent the rear side of each of said compensating bars, a slider block mounted for longitudinal movement in each said slot, a trailing pin secured to each of said slider blocks and extending outwardly thereof, each of said trailing pins being pivotally mounted on one of said pair of carrier means.

12. A rotary impression machine as set forth in claim 10 and further including a slat mounting plate for each side of each slat mounted on said slats on the face remote from said impression members, said compensating bars being secured to said slat mounting plates.

13. A rotary impression machine as set forth in claim 10, wherein some of said slats are of different length than others.

References Cited by the Examiner

UNITED STATES PATENTS

| | | | |
|---|---|---|---|
| 267,172 | 11/82 | Fiester | 101—263 |
| 998,848 | 7/11 | Howard | 101—255 X |
| 2,788,738 | 4/57 | Wood | 101—171 |
| 3,065,691 | 11/62 | Sohn | 101—227 |

FOREIGN PATENTS 36,941  10/30  Great Britain.

EUGENE R. CAPOZIO, *Primary Examiner.*